April 9, 1963

L. D. DAVIES 3,084,828

CYLINDER LEAK STOPPING DEVICE

Filed March 15, 1961

INVENTOR
LESLIE D. DAVIES

BY Oscar L. Spencer

ATTORNEY

United States Patent Office 3,084,828
Patented Apr. 9, 1963

3,084,828
CYLINDER LEAK STOPPING DEVICE
Leslie D. Davies, Alliance, Ohio, assignor to Pittsburgh Plate Glass Company, Pittsburgh, Pa., a corporation of Pennsylvania
Filed Mar. 15, 1961, Ser. No. 95,949
6 Claims. (Cl. 220—57)

This invention relates to a new and improved device for sealing off leaks which may occur in fluid storage tanks. More particularly, this invention is concerned with a structure for sealing gas leaks in large gas storage cylinders.

It is well known that vessels which are used for the storage of large volumes of fluid, either gas or liquid, occasionally develop leaks resulting in losses of the stored fluid. Such leaks occur most frequently in the end portions of storage cylinders and particularly in or near the center. When the stored fluid is a noxious or poisonous substance, such as chlorine gas, it is imperative that the leaks be sealed off immediately to avoid contamination of the surrounding vicinity. It is customary to seal off leaks which occur in the ends of cylinders by applying to the leak a sealing cap such as a metal one having a rubber gasket on the bottom. In order to completely seal the leak, particularly if it occurs in cylinders containing fluids such as gas, stored under several atmospheres of pressure, it is necessary that the sealing cap be held in place by the exertion of extremely high pressure. The apparatus which is presently used for exerting such pressures comprises a pair of metal bars bolted or welded together in T-shape disposition and adapted to engage the inside of the chime of the cylinder end at three different points, thereby forming a bridge across the end of the cylinder. A bolt extends through one of the bridge-forming metal bars and the apparatus is positioned so that the bolt extending through the bar will engage the top portion of the sealing cap. Pressure sufficient to hold the cap in place and seal the leak is applied by screwing the bolt down against the cap.

This method of sealing leaks in the ends of gas storage cylinders is not satisfactory. Due to the different sizes of cylinders, one structure cannot be used on all cylinders. Thus, a single apparatus is limited to use on only one size of cylinder. Moreover, unless extreme care is taken in assembling and mounting the apparatus on a cylinder, the ends of the bars may slip out from their position under the lip of the chime when pressure is applied by screwing the bolt down on the sealing cap. Because of the inherent awkwardness and lack of stability of this apparatus, it requires two men at least 90 seconds to completely seal off a leak by this method.

It is an object of this invention to provide a new and improved apparatus for sealing off leaks in a fluid storage tank. It is a further object of this invention to provide a gas-storage cylinder leak stopping device which will enable one man to completely and rapidly seal a leak in the end of a cylinder of any size.

The foregoing objects are accomplished by this invention which, briefly comprises in combination a pair of elongated members which are slidably arranged one upon the other, the free ends of each member being shaped so as to firmly engage with the chime of the tank, one of these elongated members being provided with a locking device adapted to prevent the members from relative movement towards each other, and a sealing element, one of the elongated members having an adjustable means thereon for operatively engaging the sealing element to force it against the hole in the tank. The locking device adapted to prevent the elongated members from relative movement towards each other may comprise a series of ratchet teeth on one member and a pawl positioned on the other member to engage the ratchet teeth. The adjustable means on one of the elongated members for operatively engaging the sealing element may comprise a stud or bolt extending transversely through the elongated member and being threadably engaged therewith. A spring means may be operatively associated with the elongated members in such a way as to be effective to forcibly move the members away from each other thereby causing both members to engage against and within the chime end edge of the tank.

The preferred embodiment of this invention is illustrated in the accompanying drawings wherein.

The drawings are more fully explained hereinafter with particular reference to the various numerical designations, each individual numeral having the same significance in the different figures.

Figure 1:
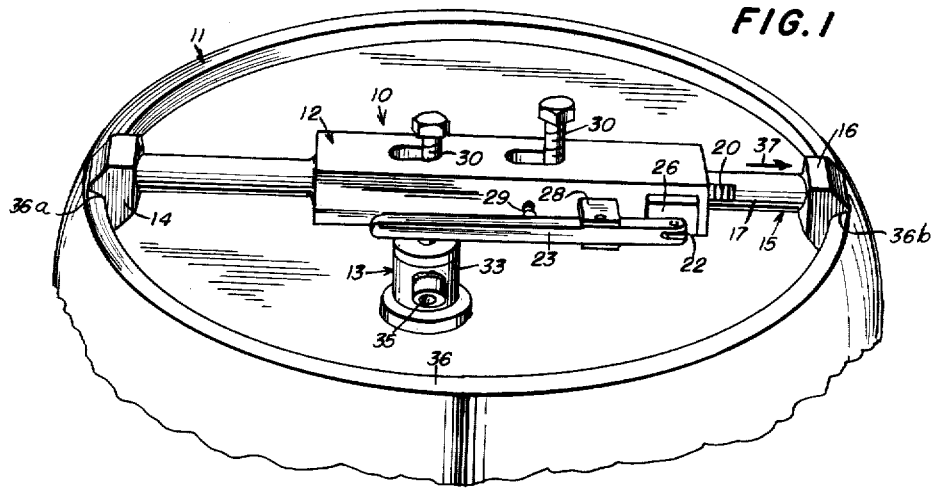
FIG. 1 is a perspective view from the side of a leak stopping device according to this invention and a fragmentary showing of the end portion of a barrel, the leak stopping device being shown in position on the end of the barrel.

Referring to the drawings in detail, FIGURE 1 shows a leak stopping device 10 constructed according to this invention in position on the end of a barrel 11. The leak stopping device consists of a bridge member 12 and a sealing cap 13. The bridge member has a stationary jaw 14 at one end thereof and a movable jaw unit 15 at the other end. The movable jaw unit 15 comprises a jaw 16 which is mounted on a shaft 17. The jaws 14 and 16 may be of any shape suitable to engage the chime of a tank. When the end of the tank has an inwardly extending chime 36 the chime engaging face of each jaw may comprise inwardly sloping lower portions 14a and 16a and inwardly sloping upper portions 14b and 16b. The points at which the upper portions and lower portions of the jaws meet form a groove in which the inside faces of the chimes 36a and 36b are securely held.

Figure 3:
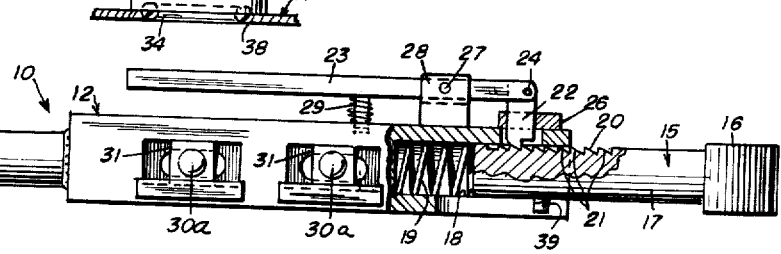
FIG. 3 is a partially sectional top plan view of the bridge member of a leak stopping device constructed in accordance with this invention.

As shown in FIG. 3, shaft 17 of the movable jaw unit is slidably positioned in the hollow end portion 18 of the bridge member 12 so that the jaw unit 15 may be moved inwardly or outwardly with respect to the stationary jaw. A coil spring 19 is located in the hollow end portion 18 so that when the jaw unit 15 is moved inwardly in the direction of the stationary jaw 14, the spring 19 is compressed and thereby exerts an opposing thrust against the jaw unit 15. In place of the spring 19, there may be provided any other suitable means for exerting an outward thrust against the jaw unit.

There is provided on the shaft 17 of the movable jaw unit 15 a ratch or notched portion 20. The ratch 20 contains a number of notches or teeth 21—21. A pawl 22, which is pivotally mounted to the handle 23 by means of a pin 24, extends through an opening in the bridge member 12, and is adapted to engage one of the teeth 21 in the ratch 20 so as to prevent rearward motion of the movable jaw unit 15. A projection 26 extends above the opening in the bridge member and surrounds the pawl 22, thereby holding the pawl stationary while it is in engagement with one of the teeth 21. The handle 23 is pivotally mounted by means of a pin 27 to an elevated portion 28 of the bridge member 12. A coil spring 29 is positioned between the handle 23 and the bridge member 12 which exerts an upward thrust against the handle preventing the handle from being depressed in the absence of an opposing force acting on the end of the handle. When the end of the handle 23 opposite the pawl 22 is forcibly depressed, the handle pivots on the pin 27 thereby raising the pawl 22 out of engagement with the ratch 20. When the force on the end of the handle is released, the compressive force of the spring 29 forces the end of the handle outward from the body of the bridge member 12 and the pawl 22 thereby is forced back into engagement with the ratch 20.

Figure 2:
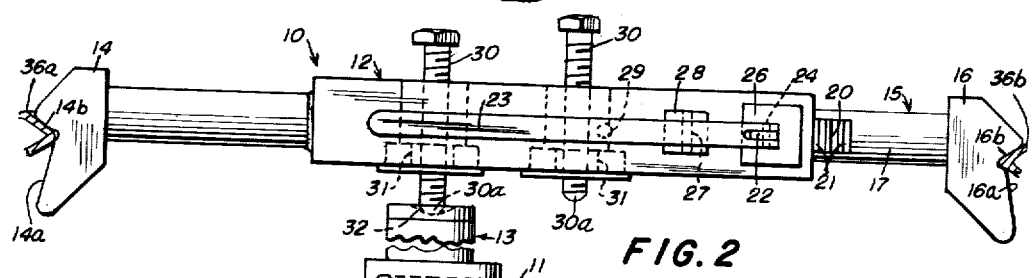
FIG. 2 is a side elevational view of a leak-stopping device constructed according to this invention and a fragmentary showing of the chime of a tank engaged by the jaws of the bridge member.

As shown in FIG. 2, the bridge member is provided with at least one and preferably two, studs or bolts 30—30 extending vertically through the longitudinal axis of the bridge. Threaded nuts 31—31 are positioned, as by welding, on the bottom side of the bridge member. The bolts 30—30 are screw threaded through the nuts 31—31. The ends 30a—30a of the bolts are preferably tapered so that they may fit into a recess 32 on the top of the sealing cap 13.

In FIG. 2, the sealing cap 13 is shown with a portion of middle section omitted to conserve drawing space.

Figure 4:
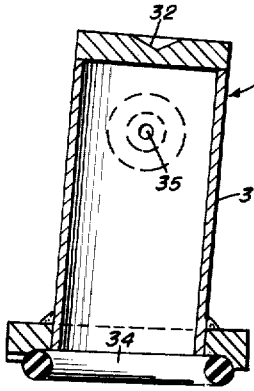
FIG. 4 is a cross sectional view of a sealing cap which may be used as a part of the leak stopping device of this invention.

Any type of sealing cap which will adequately cover a leak and to which pressure may be applied may be used in a leak-stopping device according to this invention. A preferred type of sealing cap 13 is shown in FIGURES 1 and 2 and in cross-section in FIG. 4. The sealing cap 13 comprises a covering element 33 and a sealing ring 34. A recess 32 is situated in the top of the covering element 33 to accommodate the tapered end 30a of one of the bolts 30—30. A relief valve 35 is located on the side of the covering element. This valve is to allow the leaking gas or other fluid to be tapped off and disposed of in a suitable fashion. The sealing ring 34, which may be made of any material which will make a tight seal under pressure such as rubber, is fitted snugly into the bottom portion of the covering element 33. At least a portion of the sealing ring extends below the level of the bottom of the covering element as shown in FIG. 4.

In operation, as soon as a leak is detected in the end of a fluid storage tank 11, the end of the handle 23 opposite the pawl 22 is depressed, thus raising the pawl 22 out of engagement with the ratch 20. The bridge member is then compressed lengthwise by moving the jaw unit 15 in the direction of the stationary jaw 14. When the bridge member 12 has been compressed to a length less than that of the inside diameter of the barrel end, the stationary jaw is positioned so as to engage the inside face of the chime 36a of the tank. The compressive force exerted on the movable jaw unit 15 is then released and the compressive force of the spring 19 forces the jaw unit in the direction shown by the arrow 37 in FIG. 1, thereby bringing it into engagement with the chime 36b of the tank at a point directly opposite that of the stationary jaw 14. The end of the handle 23 is released and the compressive force of the spring 29 forces the end of the handle in the opposite direction in which it had been depressed. The pawl is thereby forced into engagement with one of the teeth 21 in the ratch 20 thereby locking the jaw unit 15 in a stationary position. The sealing cap 13 is then positioned so that the sealing ring completely encloses and covers the leak 38. One of the bolts 30, which is positioned so that the tapered end 30a is directly above the recess 32, is then screwed downwardly by means of a suitable device such as a wrench. Sufficient pressure is exerted by the bolt on the sealing cap to effect a complete seal of the leak 38. Subsequently, after all of the fluid has been removed from the tank, such as by tapping the relief valve 35 or by other means, the leak stopping device may be easily removed by unscrewing the bolt 30 to relieve the pressure on the sealing cap 13. The sealing cap is removed and the handle 23 is depressed to disengage the pawl 22 from the ratch 20. The bridge member 12 is then compressed lengthwise as previously described and the bridge member is removed.

Various modifications of this invention will be apparent to those skilled in the art. For example, the bridge member 12 may be fitted with a set screw 39 which will extend into the hollow end. When the bridge member is placed in position on the end of the tank, the set screw 39 may be screwed inwardly so as to engage the shaft 17, thereby locking the movable jaw unit in a fixed position more securely. Similarly, means other than those previously described may be provided on the bridge member for exerting pressure on the sealing cap. For example, instead of a threaded stud of bolt adapted to be moved by screwing, the bridge member may be provided with a pneumatic jack-type device adapted to force a stud downwardly.

It has been found that by using the leak-stopping device of this invention, one man is able to completely seal off a leak which may develop in the end portion of a fluid storage cylinder of any size in a total elapsed period of only seventeen seconds whereas using devices previously known to the art, it has required two men 90 seconds to complete such a seal. Moreover, once in position, the leak stopping device of this invention will not become accidentally disengaged.

What is claimed is:

1. A device for stopping the flow of a fluid from a hole in a tank having a chime portion comprising in combination, a pair of elongated members contiguously positioned in sliding contact with one another, the free ends of each member having shaped portions to firmly engage with the chime of the tank, one of said elongated members having a locking device thereon having cooperating engagement with the other member to prevent the members from relative movement towards each other, a sealing element, and adjustable means on one of said members engaging said sealing element to force it against the hole in the tank.

2. An assembly as set forth in claim 1 wherein said adjustable means is adapted for longitudinal movement along one of said slidably arranged members.

3. A clamp-on sealing assembly for patching a leak area in the end wall of a tank having a chime portion comprising, a pair of members contiguously positioned in sliding arrangement with one another, the free ends of each member having shaped portions to firmly engage with the chime of the tank, one member having a series of ratchet teeth, the other member having a pawl positioned to engage said teeth and being operative to lock the members against relative movement towards each other, a sealing element, and adjustable means on one of said members engaging said sealing element to force it towards the tank end wall and against a leak area therein, said adjustable means being laterally movable in an elongated aperture on one side of said members.

4. An assembly as set forth in claim 3, wherein the adjustable means is comprised of a stud member extending transversely through said last named member and being threadably engaged therewith.

5. In an assembly as set forth in claim 3, spring means operatively associated with said members and being effective to forcibly move said members away from each other to cause both members to engage against and within the chime end edge of the tank.

6. A device for stopping the flow of a fluid from a hole in a tank having a chime engaging portion comprising in combination a pair of elongated members contiguously positioned in sliding contact with one another, each said sliding member having a free end terminating in a portion shaped to provide for firm engagement with the chime portion of the tank, one of said elongated members having a locking device thereon in cooperating engagement with the other said elongated member to prevent the members from relative movement towards each other, one of said elongated members having an elongated aperture, adjustable pressure applying means positioned in said aperture and extending toward said tank, said pressure applying means being laterally movable in said aperture and adapted to engage a sealing element to force said sealing element against a hole in said tank.

References Cited in the file of this patent

UNITED STATES PATENTS

| | | |
|---|---|---|
| 468,463 | Ludwig | Feb. 9, 1892 |
| 627,317 | Barratt | June 20, 1899 |
| 638,574 | Greger | Dec. 5, 1899 |
| 2,535,275 | Dixon | Dec. 26, 1950 |
| 2,618,402 | Scott | Nov. 18, 1952 |

UNITED STATES PATENT OFFICE

CERTIFICATE OF CORRECTION

Patent No. 3,084,828                            April 9, 1963

Leslie D. Davies

It is hereby certified that error appears in the above numbered patent requiring correction and that the said Letters Patent should read as corrected below.

Column 4, line 56, strike out "side".

Signed and sealed this 18th day of August 1964.

(SEAL)
Attest:

ERNEST W. SWIDER
Attesting Officer

EDWARD J. BRENNER
Commissioner of Patents